(12) United States Patent
Silorio et al.

(10) Patent No.: US 11,707,019 B2
(45) Date of Patent: Jul. 25, 2023

(54) METHOD OF REFURBISHING A LANDSCAPE POWER TOOL

(71) Applicant: TOWA INDUSTRIES, LLC, Campbell, CA (US)

(72) Inventors: Ron Silorio, Pittsburg, CA (US); Richard K. Ogawa, Sr., Palo Alto, CA (US)

(73) Assignee: TOWA INDUSTRIES, INCORPORATED, Campbell, CA (US)

( * ) Notice: Subject to any disclaimer, the term of this patent is extended or adjusted under 35 U.S.C. 154(b) by 228 days.

(21) Appl. No.: 17/183,622

(22) Filed: Feb. 24, 2021

(65) Prior Publication Data

US 2022/0264795 A1    Aug. 25, 2022

(51) Int. Cl.

| | | |
|---|---|---|
| *A01D 34/90* | (2006.01) | |
| *A01B 1/06* | (2006.01) | |
| *A01G 3/06* | (2006.01) | |
| *A01D 34/416* | (2006.01) | |
| *A01G 3/053* | (2006.01) | |
| *A01B 1/20* | (2006.01) | |

(52) U.S. Cl.
CPC ............ *A01D 34/90* (2013.01); *A01B 1/065* (2013.01); *A01B 1/20* (2013.01); *A01D 34/4165* (2013.01); *A01G 3/0535* (2013.01); *A01G 3/062* (2013.01)

(58) Field of Classification Search
CPC ... B25F 3/00; B25F 5/02; A01B 1/065; A01B 1/227
See application file for complete search history.

(56) References Cited

U.S. PATENT DOCUMENTS

| | | | | | |
|---|---|---|---|---|---|
| 2,054,009 | A | * | 9/1936 | Thrush | ............ F16D 3/72 464/57 |
| 4,270,063 | A | * | 5/1981 | Dochterman | ............ H02K 7/14 310/66 |
| 5,787,693 | A | * | 8/1998 | Dyke | ............ A01D 34/81 56/2 |
| 5,810,093 | A | | 9/1998 | Howard | |
| 6,318,055 | B1 | * | 11/2001 | Bird | ............ A01D 43/10 56/13.6 |

(Continued)

FOREIGN PATENT DOCUMENTS

| | | |
|---|---|---|
| CN | 211125425 U | 7/2020 |
| CN | 211220562 U | 8/2020 |

*Primary Examiner* — Evan H MacFarlane
*Assistant Examiner* — Liang Dong
(74) *Attorney, Agent, or Firm* — Microelectronic Devices IP LLC; Shawn T. Walsh

(57) ABSTRACT

A method of refurbishing a handheld landscape power tool includes separating an original motor of the power tool from a tool head of the power tool. The tool head includes a tool shaft extending proximate to the original motor. A replacement power head and a shaft coupler are provided. The replacement power head includes a motor and a power shaft mechanically coupled to the motor. The shaft coupler includes a power shaft connecter coupled to a shaft-specific connecter. The replacement power head is coupled to the shaft coupler by connecting the power shaft connecter to the power shaft of the replacement power head. The tool head is coupled to the shaft coupler by connecting the shaft-specific connecter to the tool shaft of the tool head.

20 Claims, 11 Drawing Sheets

(56) References Cited

U.S. PATENT DOCUMENTS

| | | | |
|---|---|---|---|
| 7,493,696 B2* | 2/2009 | Suzuki | A01D 34/90 |
| | | | 56/16.7 |
| 7,707,728 B2 | 5/2010 | Cobb | |
| 8,020,304 B2* | 9/2011 | Mace | B23D 57/023 |
| | | | 464/53 |
| 8,651,196 B2 | 2/2014 | Sedmak | |
| 10,279,461 B2 | 5/2019 | Miaowu et al. | |
| 2006/0248731 A1* | 11/2006 | Suzuki | A01D 34/90 |
| | | | 30/276 |
| 2008/0038073 A1* | 2/2008 | Paolicelli | B25F 3/00 |
| | | | 408/99 |
| 2012/0138322 A1* | 6/2012 | Neubauer | B24B 27/08 |
| | | | 173/2 |
| 2013/0075122 A1 | 3/2013 | Yamada et al. | |
| 2018/0092297 A1* | 4/2018 | Sunazuka | G01P 15/0891 |
| 2018/0104809 A1* | 4/2018 | Dyer | B27B 17/0016 |
| 2019/0074489 A1* | 3/2019 | Yamaoka | A45F 3/14 |
| 2019/0090405 A1 | 3/2019 | Bermudez | |

* cited by examiner

METHOD OF REFURBISHING A LANDSCAPE POWER TOOL

FIELD

This disclosure relates to the field of outdoor power equipment. More particularly, but not exclusively, this disclosure relates to handheld electrically powered outdoor power equipment.

BACKGROUND

Outdoor power equipment includes weed trimmers, pole saws, hedge trimmers, garden tillers, pruning shears, leaf blowers, and lawn edgers. A typical power landscaping tool includes a motor, either an electric motor or a combustion engine, which powers a tool head, such as a weed trimmer head, or a pole saw head, or a hedge trimmer head, etc. Motors of power landscaping tools are being increasingly restricted with regard to exhaust emissions and noise in many communities.

SUMMARY

The present disclosure introduces a method of refurbishing a handheld landscape power tool. The handheld landscape power tool to be refurbished includes at least an original motor and a tool head. The tool head includes a tool shaft extending proximate to the original motor. The handheld landscape power tool may include an original throttle with an original throttle cable coupled to the original power head.

The original motor is separated from the tool head. The method of refurbishing the handheld landscape power tool uses a replacement power head and a shaft coupler. The replacement power head includes a motor, and a power shaft mechanically coupled to the motor.

The shaft coupler includes a power shaft connecter coupled to a shaft-specific connecter. The power shaft connecter is configured to be capable of being mechanically coupled to the power shaft of the replacement power head. The shaft-specific connecter is configured to be capable of being mechanically coupled to the tool shaft of a tool head.

The replacement power head is coupled to the shaft coupler by connecting the power shaft connecter to the power shaft of the replacement power head. The tool head is coupled to the shaft coupler by connecting the shaft-specific connecter to the tool shaft of the tool head.

DETAILED DESCRIPTION

The present disclosure is described with reference to the attached figures. The figures are not drawn to scale and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

A handheld landscape power tool has a motor mechanically coupled to a tool head. The motor may have undesirable aspects. In some cases, the motor may be a combustion engine that produces exhaust emissions or noise in excess of local regulations. In other cases, the motor may be a non-functional combustion engine or a non-functional electric motor. In further cases, the motor may produce less power than desired. Refurbishing the handheld landscape power tool advantageously allows continued use of the tool head, and may be more economical than purchasing a new handheld landscape power tool.

Figure 1A:
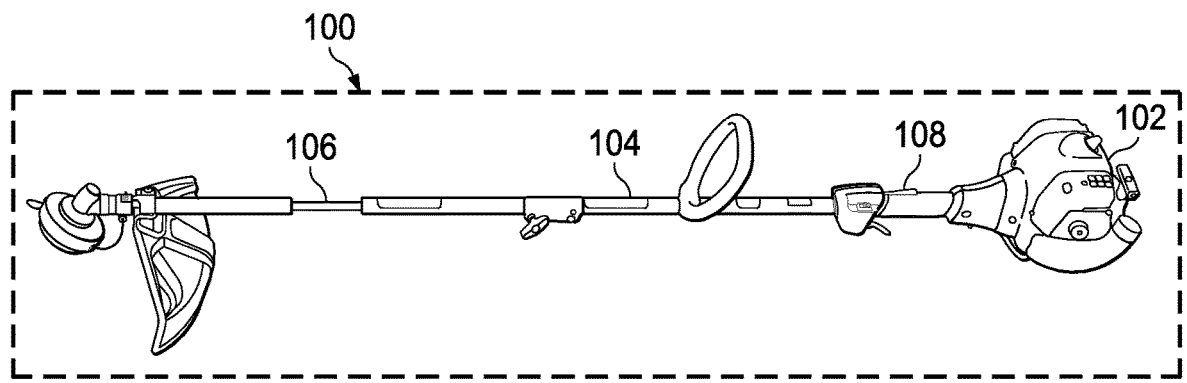
FIG. 1A through FIG. 1D are schematic representations of an example method of refurbishing a handheld landscape power tool.

FIG. 1A through FIG. 1D are representations of an example method of refurbishing a handheld landscape power tool 100, referred to herein as the original power tool 100. Referring to FIG. 1A, the original power tool 100 includes an original motor 102, such as a combustion engine, as depicted in FIG. 1A, or an electric motor. The original power tool 100 also includes a tool head 104 that is mechanically coupled to the original motor 102. The tool head 104 may be manifested as a string trimmer head, as depicted in FIG. 1A. Alternately, the tool head 104 may be manifested as a blade trimmer head, a reciprocating saw head, a chain saw head, a hedge trimmer head, a garden tiller head, a pruning shears head, or a lawn edger head, by way of example. The tool head 104 includes a tool shaft 106 that extends toward the original motor 102. In this example, the original power tool 100 may include an original throttle 108 mounted on the tool head 104. The original throttle 108 includes an original throttle cable, not shown, coupled to the original motor 102.

Figure 1B:
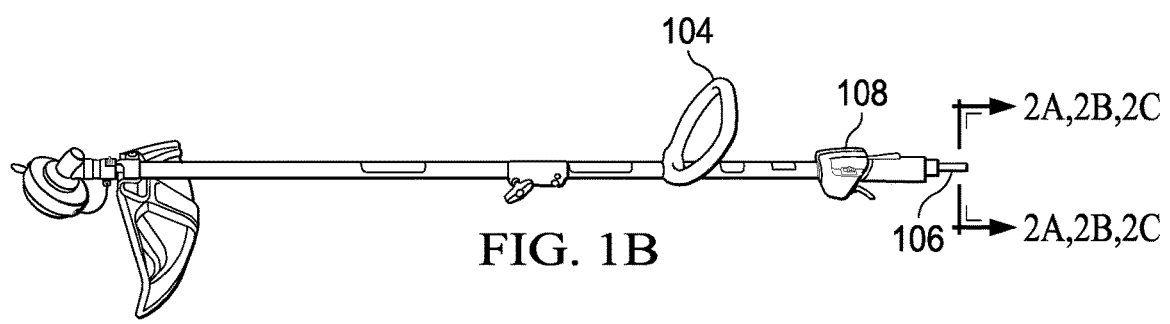

Referring to FIG. 1B, the original motor 102 is separated from the tool head 104. In some versions of this example, the original motor 102 may be separated from the tool head 104 by releasing a clamping mechanism, not shown, that is located proximate to a juncture of the original motor 102 and the tool head 104. In other versions of this example, attaching elements such as screws and rivets may be removed to separate the original motor 102 from the tool head 104. The tool shaft 106 extends to, or proximate to, an end of the tool head 104 from which the original motor 102 of FIG. 1A was separated from the tool head 104. In one version of this example, the original throttle 108 may be left in place on the tool head 104. In another version, the original throttle 108 may be removed.

Figure 2A:
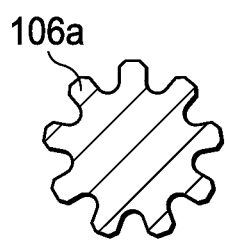
FIG. 2A through FIG. 2C are example cross sections of the tool shaft.
Figure 2B:
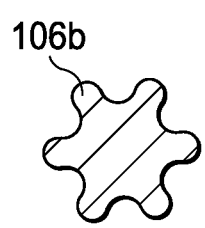
Figure 2C:
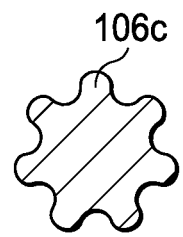

The tool shaft 106 has a configuration that provides efficient transfer of rotation mechanical power to the tool head 104. Example cross sections of the tool shaft 106 are depicted in FIG. 2A through FIG. 2C, and will be discussed in more detail below.

Figure 1C:
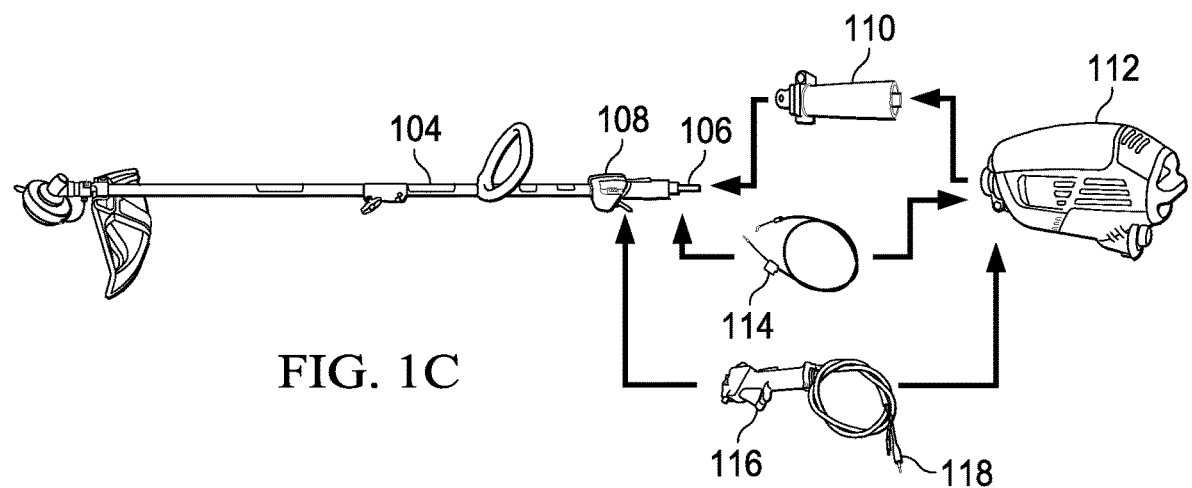

Referring to FIG. 1C, a shaft coupler 110 is provided. The shaft coupler 110 is shown in more detail in FIG. 3A, and is discussed in more detail with reference to FIG. 3A through FIG. 3G, below. Referring back to FIG. 1C, the shaft coupler 110 is mechanically coupled to the tool head 104. The shaft coupler 110 includes a shaft-specific connecter 130, shown in FIG. 3A, that has a complementary configuration to the tool shaft 106. The shaft-specific connecter 130 is mechanically connected to the tool shaft 106 when the shaft coupler 110 is mechanically coupled to the tool head 104. The shaft coupler 110 may be removably clamped to the tool head 104, by a coupler clamp mechanism 146, shown in FIG. 3A. Alternately, the shaft coupler 110 may be permanently attached to the tool head 104, for example, by screws, bolts, rivets, or adhesive.

A replacement power head 112 is provided. The replacement power head 112 is shown in more detail in FIG. 4A, and is discussed in more detail with reference to FIG. 4A through FIG. 4F, below. The replacement power head 112 includes a motor 150, shown in FIG. 4A. The motor 150 may be manifested as an electric motor or a reduced emission combustion engine. Disclosed examples will be described with the motor 150 manifested as a direct current (DC) electric motor 150.

Figure 3A:
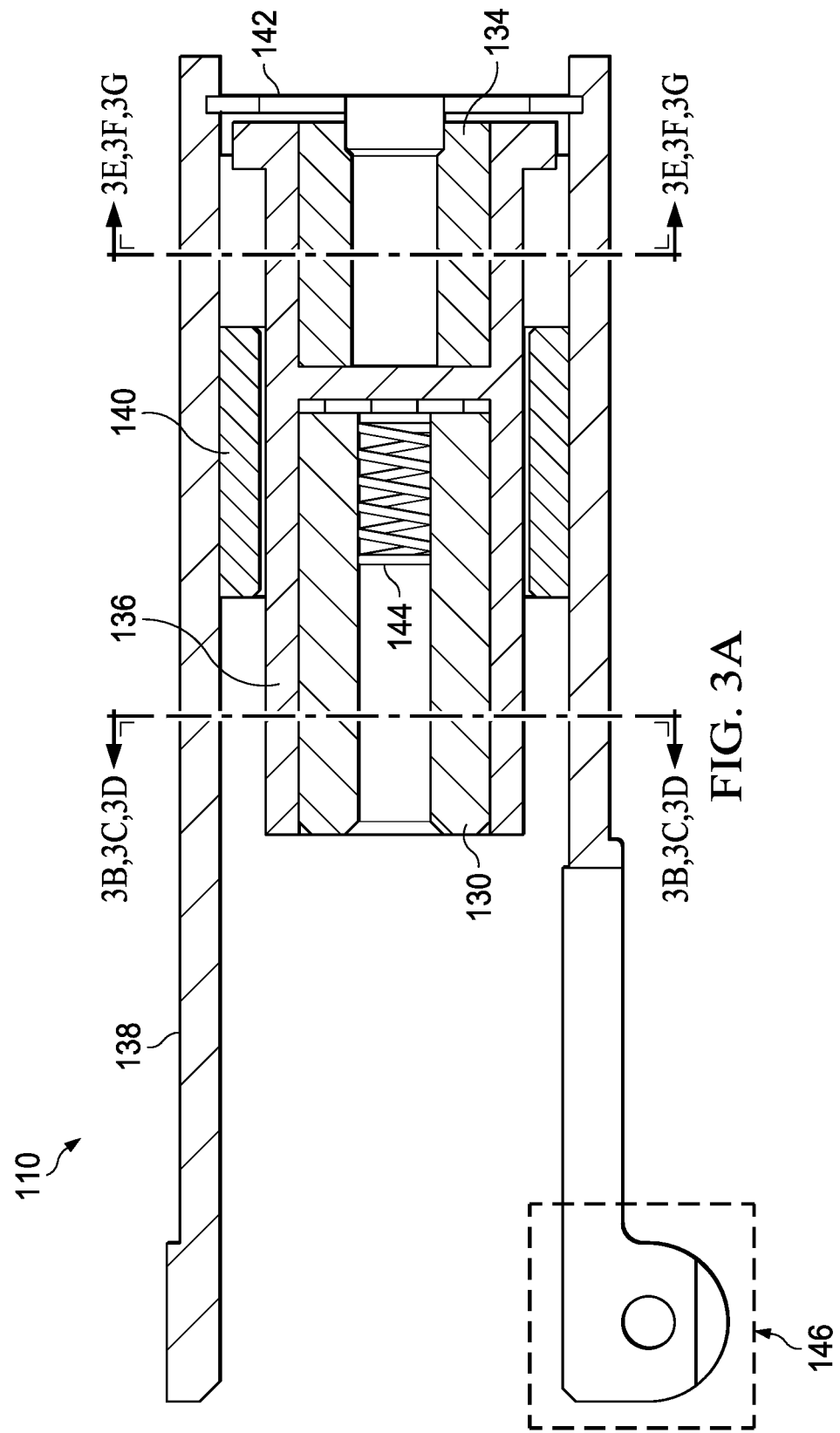
FIG. 3A is a cross section of the shaft coupler.
Figure 4A:
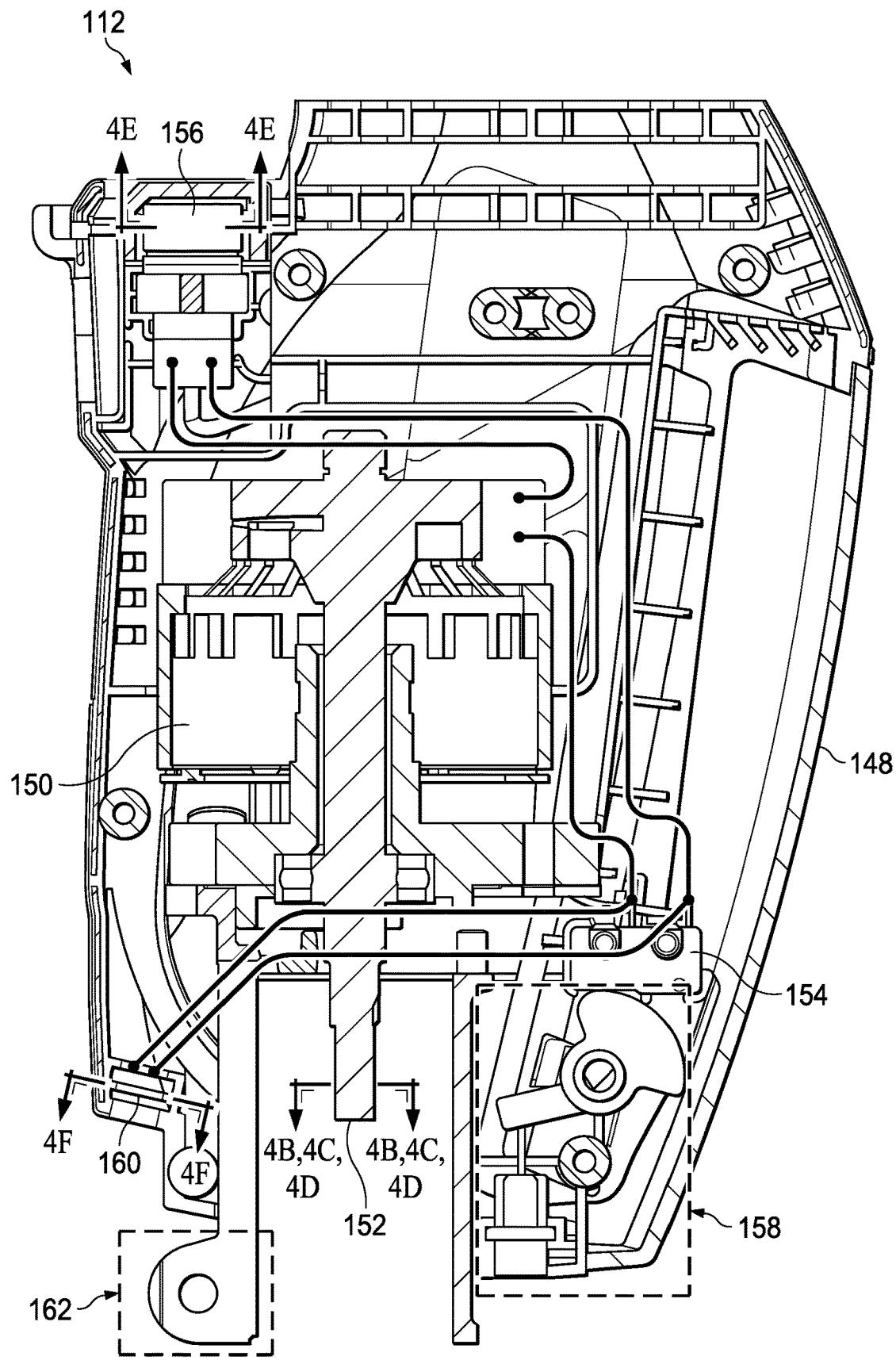
FIG. 4A is cross section view of the replacement power head.

The replacement power head 112 includes a power shaft 152, shown in FIG. 4A, mechanically coupled to the motor 150. Referring back to FIG. 1C, the shaft coupler 110 is mechanically coupled to the replacement power head 112. The shaft coupler 110 includes a power shaft connecter 134, shown in FIG. 3A, that has a complementary configuration to the power shaft 152. The power shaft connecter 134 is mechanically connected to the power shaft 152 when the shaft coupler 110 is mechanically coupled to the replacement power head 112. The power shaft connecter 134 is mechanically coupled to the shaft-specific connecter 130 to efficiently transfer rotational mechanical power from the replacement power head 112 to the tool head 104. The shaft coupler 110 may be removably clamped to the replacement power head 112, by a head clamp mechanism 162, shown in FIG. 4A.

The replacement power head 112 may include an electric switch 154, shown in FIG. 4A, that is electrically coupled to the electric motor 150, to control electric power to the electric motor 150. The replacement power head 112 may include a throttle cable adapter 158, shown in FIG. 4A, that is mechanically coupled to the electric switch 154, configured to operate the electric switch 154. In versions of this example in which the original throttle 108 is left in place on the tool head 104, a throttle cable 114 is connected to the original throttle 108 and is attached to the throttle cable adapter 158 of the replacement power head 112, enabling the original throttle 108 to control the electric motor 150. The throttle cable 114 may be an original throttle cable that was attached to the original throttle 108, or may be a replacement throttle cable, provided for refurbishing the original power tool 100 of FIG. 1A. In versions of this example in which the original throttle 108 is removed, a replacement throttle 116 with a replacement throttle cable 118 may be provided. The replacement throttle 116 is installed on the tool head 104.

The replacement throttle cable 118 is connected to the replacement throttle 116, and is attached to the throttle cable adapter of the replacement power head 112, enabling the replacement throttle 116 to control the electric motor of the replacement power head 112. The replacement throttle 116 may be manifested as trigger throttle, as depicted in FIG. 1C, a press-button throttle, or a toggle lever throttle, by way of example.

Figure 1D:
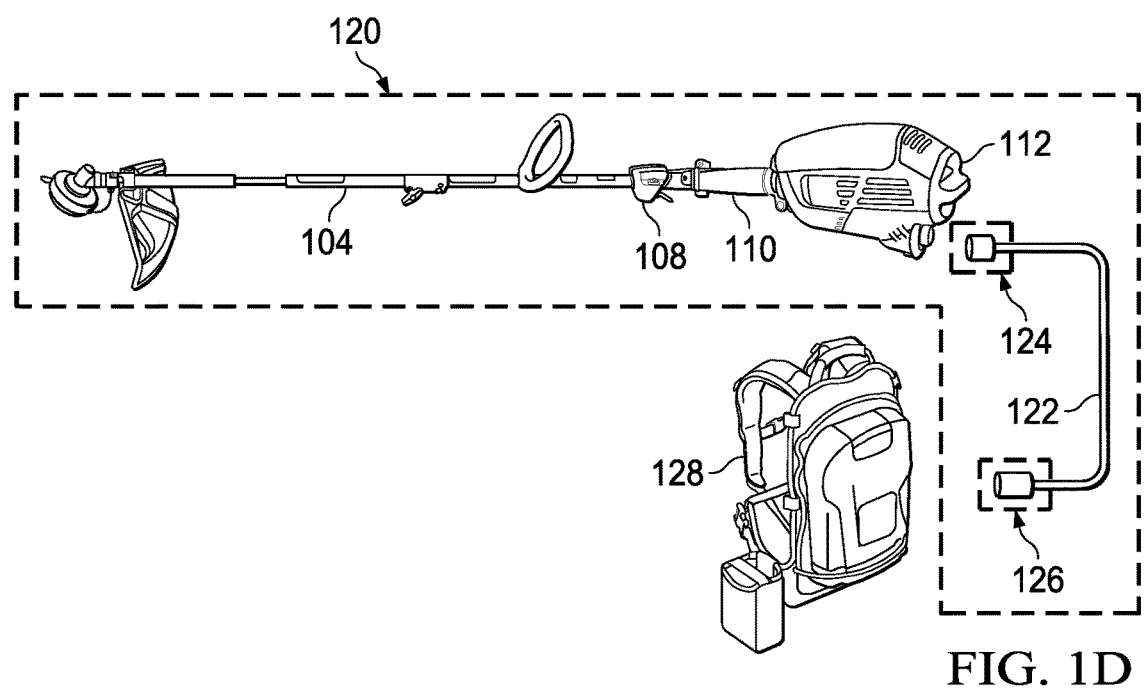

Referring to FIG. 1D, the replacement power head 112, coupled to the tool head 104 through the shaft coupler 110, provides a refurbished handheld landscape power tool 120, referred to herein as the refurbished power tool 120. The refurbished power tool 120 of this example may include the original throttle 108 and the throttle cable 114 of FIG. 1C, or may include the replacement throttle 116 and the replacement throttle cable 118.

The refurbished power tool 120 may optionally include a power cable 122 to electrically couple the replacement power head 112 to an external power source 128, such as a battery backpack 128, as depicted in FIG. 1D. Other manifestations of the external power source 128, such as a battery belt, are within the scope of this example. The power cable 122 includes a power head plug 124 that is configured to be capable of connecting to a power cable socket 156, shown in FIG. 4A, of the replacement power head 112. The power cable 122 of this example includes a power source-specific plug 126 that is configured to be capable of connecting to the external power source 128. In one version of this example, the refurbished power tool 120 may optionally be provided with the external power source 128. In another version, the power source-specific plug 126 may be selected to match an existing external power source 128 owned by a user of the refurbished power tool 120. Having the power cable 122 with the power source-specific plug 126 may advantageously enable use of a desired manifestation of the external power source 128 with the refurbished power tool 120, resulting in a lower total cost for the user.

FIG. 2A through FIG. 2C are example cross sections of the tool shaft 106 of FIG. 1A, of the tool head 104 of FIG. 1A. In one version of this example, a first tool shaft 106*a* may have a nine-spline configuration, as depicted in FIG. 2A. In another version, a second tool shaft 106*b* may have a six-spline configuration, as depicted in FIG. 2B. In a further version, a third tool shaft 106*c* may have a seven-spline configuration, as depicted in FIG. 2C. Other cross section configurations of the tool shaft 106 are within the scope of this example.

Figure 3B:
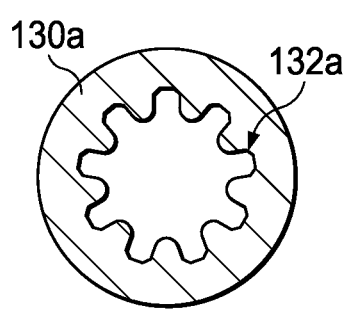
FIG. 3B through FIG. 3D are example cross sections of the shaft-specific connecter.
Figure 3C:
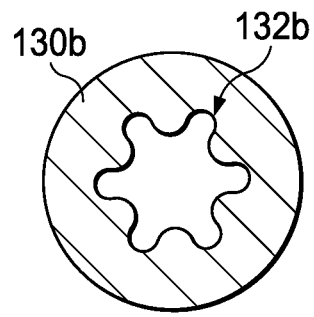
Figure 3D:
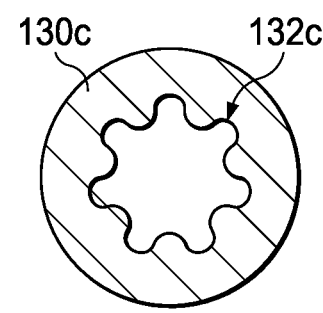
Figure 3E:
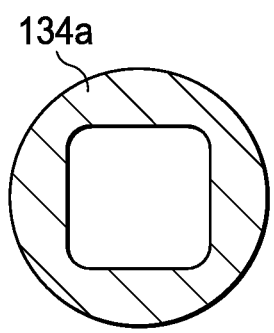
FIG. 3E through FIG. 3G are example cross sections of the power shaft connecter.
Figure 3F:
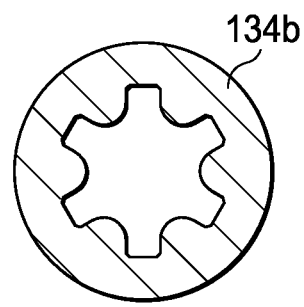
Figure 3G:
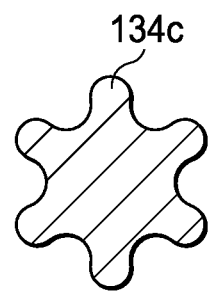

FIG. 3A is a cross section of the shaft coupler 110. The shaft coupler 110 includes a shaft-specific connecter 130 that is configured to be capable of being mechanically connected to the tool shaft 106 of FIG. 1A. The shaft-specific connecter 130 has a complementary configuration to the configuration of the tool shaft 106. In one version of this example, in which the tool shaft 106 has the nine-spline configuration depicted in FIG. 2A, a first shaft-specific connecter 130*a* may have a nine-spline socket configuration 132*a*, as depicted in FIG. 3B. In another version of this example, in which the tool shaft 106 has the six-spline configuration depicted in FIG. 2B, a second shaft-specific connecter 130*b* may have a six-spline socket configuration 132*b*, as depicted in FIG. 3C. In a further version of this example, in which the tool shaft 106 has the seven-spline configuration depicted in FIG. 2C, a third shaft-specific connecter 130*c* may have a seven-spline socket configuration 132*c*, as depicted in FIG. 3D.

The shaft coupler 110 includes a power shaft connecter 134 that is configured to be capable of being mechanically connected to the power shaft 152 of FIG. 4A. The power shaft connecter 134 has a complementary configuration to the configuration of the power shaft 152. In one version of this example, a first power shaft connecter 134*a* may have a square socket configuration, as depicted in FIG. 3E, that enables being mechanically connected to a first power shaft 152*a* depicted in FIG. 4B. In another version, a second power shaft connecter 134*b* may have a splined socket configuration, as depicted in FIG. 3F, that enables being mechanically connected to a second power shaft 152*b* depicted in FIG. 4C. In a further version, a third power shaft connecter 134*c* may have a splined configuration, as depicted in FIG. 3G, that enables being mechanically connected to a third power shaft 152*c* depicted in FIG. 4D.

The power shaft connecter 134 is coupled to the shaft-specific connecter 130, to enable efficient transfer of rotational mechanical power from the power shaft 152 to the tool shaft 106. The power shaft connecter 134 may be coupled to the shaft-specific connecter 130 by a connecter sleeve 136, as depicted in FIG. 3A. Alternatively, the power shaft connecter 134 may be directly attached to the shaft-specific connecter 130, for example by a weld joint. In another variation of this example, the power shaft connecter 134 and the shaft-specific connecter 130 may be parts of a single integrated connector member.

The shaft coupler 110 includes a coupler housing 138 around the power shaft connecter 134 and the shaft-specific connecter 130. The power shaft connecter 134 and the shaft-specific connecter 130 are rotationally supported in the coupler housing 138, for example by a coupler bearing 140.

The shaft coupler 110 may include a retaining clip 142 set in an inside surface of the coupler housing 138. The retaining clip 142 may advantageously hold the power shaft connecter 134 in a desired position within the coupler housing 138. The shaft coupler 110 may include a shaft spring 144 in the shaft-specific connecter 130. The shaft spring 144 contacts the tool shaft 106 when the shaft-specific connecter 130 is connected to the tool shaft 106. The shaft spring 144 may advantageously reduce unwanted longitudinal vibration of the tool shaft 106 in the tool head 104 during operation of the refurbished power tool 120.

The shaft coupler 110 may include a coupler clamp mechanism 146 on the coupler housing 138 around the shaft-specific connecter 130. The coupler clamp mechanism 146 is used to clamp the tool head 104 to the shaft coupler 110, to advantageously reduce unwanted movement of the tool head 104 relative to the shaft coupler 110. The coupler clamp mechanism 146 may include a threaded knob, not shown, or a threaded lever, not shown, to adjust a clamping force on the tool head 104.

The shaft coupler 110 may have a length sufficient to provide secure clamping to the replacement power head 112 and the tool head 104. The shaft coupler 110 may be sufficiently short as to facilitate maneuvering the refurbished power tool 120, and to reduce cost of the shaft coupler 110. The shaft coupler 110 may be 3 inches to 7 inches long, advantageously satisfying both goals.

FIG. 4A is cross section view of the replacement power head 112 of FIG. 1C. The replacement power head 112 includes a housing 148 which provides structural support for components in the replacement power head 112. The replacement power head 112 includes a motor 150, located inside the housing 148. The motor 150 of this example may be manifested as an electric motor 150, as indicated in FIG. 4A. The electric motor 150 may be a DC electric motor, by way of example. When manifested as a DC electric motor, the electric motor 150 may operate at 12 volts to 120 volts, by way of example. The electric motor 150 may have a power rating of 300 watts to 2,000 watts, by way of example.

Figure 4B:
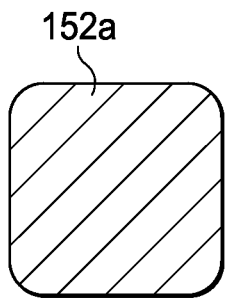
FIG. 4B through FIG. 4F are example cross sections of the power shaft.
Figure 4C:
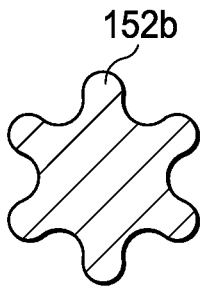
Figure 4D:
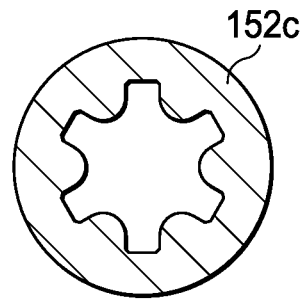

The replacement power head 112 includes a power shaft 152 that is mechanically coupled to the electric motor 150. The power shaft 152 may be an extension of a rotor of the electric motor 150, as depicted in FIG. 4A. Other manifestations of the power shaft 152 are within the scope of this example. The power shaft 152 has a cross section that facilitates rotational transfer of mechanical power to the shaft coupler 110 of FIG. 1C. In one version of this example, a first power shaft 152*a* may have a square cross section, as depicted in FIG. 4B. The square cross section may facilitate connecting the power shaft 152 to the power shaft connecter 134 of the shaft coupler 110. In another version, a second power shaft 152*b* may have a splined cross section, as depicted in FIG. 4C. The splined cross section may provide more efficient rotational mechanical power transfer from the power shaft 152 to the tool head 104. In a further version, a third power shaft 152*c* may have a socket cross section, such as a splined socket cross section, as depicted in FIG. 4D. The splined socket cross section may provide more durability for the power shaft 152. Other cross section configurations for the power shaft 152 are within the scope of this example.

Referring back to FIG. 4A, the replacement power head 112 may include an electric switch 154 that is electrically coupled to the electric motor 150, as depicted schematically in FIG. 4A. The electric switch 154 is configured to control electric power to the electric motor 150. The electric switch 154 may be implemented as a single pole single throw switch, a double pole single throw switch, or a more complex switch. In one version of this example, the electric switch 154 may be implemented as a snap action switch, such as a plunger switch, depicted in FIG. 4A, or a lever switch actuated switch. In another version of this example, the electric switch 154 may be implemented as a reed switch that is actuated by a magnet. In a further version of this example, the electric switch 154 may be implemented as a solid state switch, such as a Hall effect switch. In other versions of this example, the electric switch 154 may use piezoelectric material or quantum tunneling composite (QTC) material to control bias to a power transistor of the electric switch 154. Other manifestations of the electric switch 154 are within the scope of this example.

Figure 4E:
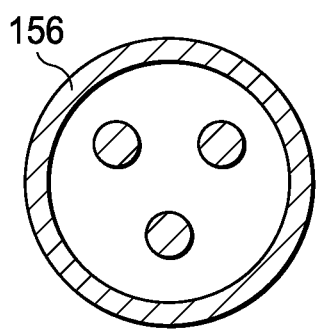

The replacement power head 112 may include a power cable socket 156 electrically coupled to the electric motor 150 through the electric switch 154, as depicted schematically in FIG. 4A. In versions of this example in which the electric switch 154 is implemented as a single pole single throw switch, the power cable socket 156 may also be electrically coupled to the electric motor 150 by a return line, as depicted schematically in FIG. 4A. The power cable socket 156 is configured to receive electric power from an external power source, such as the external power source 128 through the power cable 122 of FIG. 1D, and direct the electric power to the electric switch 154. The power cable socket 156 may have a three prong configuration, as depicted in FIG. 4E. Other configurations for the power cable socket 156 are within the scope of this example.

The replacement power head 112 may include a throttle cable adapter 158 that is mechanically coupled to the electric switch 154, configured to operate the electric switch 154. The throttle cable adapter 158 is coupled to the throttle cable 114 or the replacement throttle cable 118 of FIG. 1C, which provides a longitudinal motion during operation of the handheld electrically powered landscaping tool. The longitudinal motion of the throttle cable 114 is transferred to the throttle cable adapter 158, which operates the electric switch 154, controlling the electric power provided through the power cable socket 156 to the electric motor 150.

Figure 4F:
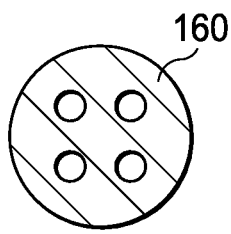

The replacement power head 112 may include a switch cable socket 160 that is electrically wired in parallel to the electric switch 154, as indicated schematically in FIG. 4A. The switch cable socket 160 may have a four prong configuration, as depicted in FIG. 4F. Other configurations for the switch cable socket 160 are within the scope of this example. The switch cable socket 160 may be connected to a switch cable 268 of an add-on switch 266, shown in FIG. 5C, for example.

The replacement power head 112 may include a head clamp mechanism 162 around the power shaft 152 which is clamped on the shaft coupler 110. The head clamp mechanism 162 may advantageously reduce unwanted movement of the shaft coupler 110 relative to the replacement power head 112. The head clamp mechanism 162 may include a threaded knob, not shown, or a threaded lever, not shown, to adjust a clamping force on the shaft coupler 110.

Figure 5A:
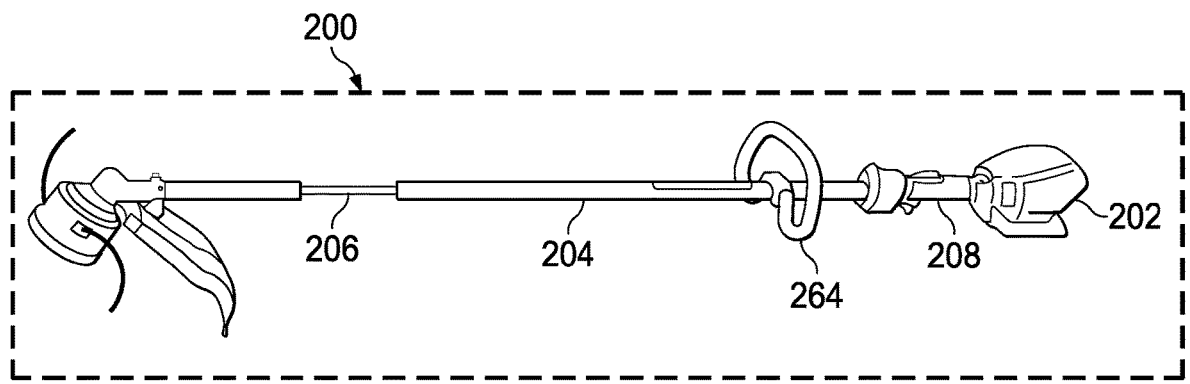
FIG. 5A through FIG. 5D are schematic representations of another example method of refurbishing another handheld landscape power tool.

FIG. 5A through FIG. 5D are schematic representations of another example method of refurbishing another handheld landscape power tool 200, referred to herein as the original power tool 200. Referring to FIG. 5A, the original power tool 200 includes an original motor 202, such as an electric motor, as depicted in FIG. 5A, or a combustion engine. The original power tool 200 also includes a tool head 204 that is mechanically coupled to the original motor 202. The tool head 204 may be manifested as a string trimmer, as depicted in FIG. 5A. Alternately, the tool head 204 may be manifested as a blade trimmer head, a reciprocating saw head, a chain saw head, and a hedge trimmer head, a garden tiller head, a pruning shears head, or a lawn edger head, by way of example. The tool head 204 includes a tool shaft 206 that extends toward the original motor 202. In this example, the original power tool 200 may include an original throttle 208 mounted on the tool head 204. The original throttle 208 includes an original throttle cable, not shown, coupled to the original motor 202. The original power tool 200 may include an original handle 264 on the tool head 204.

Figure 5B:
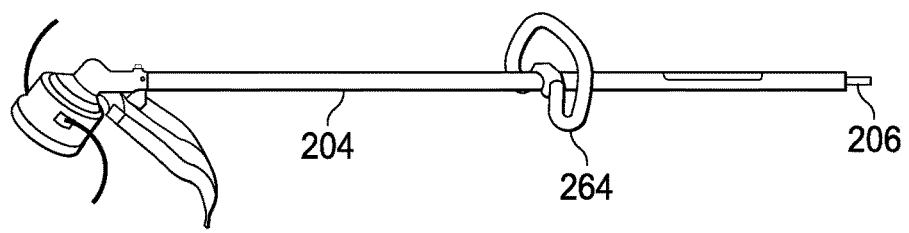

Referring to FIG. 5B, the original motor 202 is separated from the tool head 204. The original motor 202 may be separated from the tool head 204 by releasing a clamping mechanism, or removing attaching elements, such as screws and rivets, for example. Other methods of separating the original motor 202 from the tool head 204 are within the scope of this example. The tool shaft 206 extends to, or proximate to, an end of the tool head 204 from which the original motor 202 of FIG. 5A was separated from the tool head 204. In this example, the original throttle 208 is removed from the tool head 204. The original handle 264 may be left in place on the tool head 204, or moved, to improve balance and maneuverability. Alternatively, the original handle 264 may be removed, or replaced with a replacement handle, not shown.

The tool shaft 206 has a configuration that provides efficient transfer of rotation mechanical power to the tool head 204. The tool shaft 206 may have any of the cross section configurations shown in FIG. 5A through FIG. 5C, for example. Other cross section configurations for the tool shaft 206 are within the scope of this example.

Figure 5C:
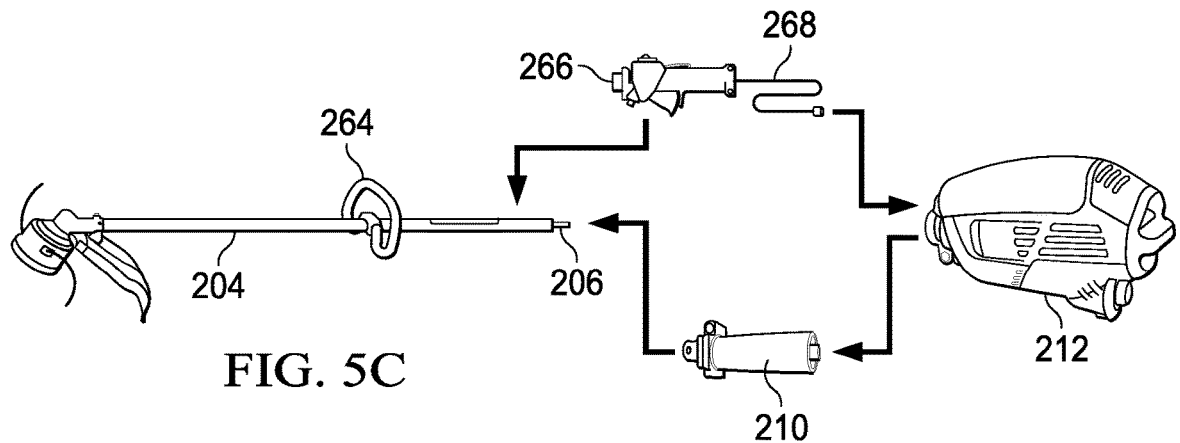

Referring to FIG. 5C, a shaft coupler 210 is provided. The shaft coupler 210 may be similar to the shaft coupler 110 of FIG. 3A. The shaft coupler 210 includes a shaft-specific connecter, not shown, that has a complementary configuration to the tool shaft 206. The shaft coupler 210 is mechanically coupled to the tool head 204, by mechanically connecting the shaft-specific connecter to the tool shaft 206. The shaft coupler 210 may be removably clamped to the tool head 204, by a clamping mechanism, such as the coupler clamp mechanism 146 of FIG. 3A. Alternately, the shaft coupler 210 may be permanently attached to the tool head 204.

A replacement power head 212 is provided. The replacement power head 212 may be similar to the replacement power head 112 of FIG. 4A. The replacement power head 212 includes a motor, such as the motor 150 of FIG. 3A, and a power shaft, such as the power shaft 152 of FIG. 4A, mechanically coupled to the motor.

The shaft coupler 210 includes a power shaft connecter, similar to the power shaft connecter 134 of FIG. 4A, that has a complementary configuration to the power shaft. The shaft coupler 210 is mechanically coupled to the replacement power head 212 by mechanically connecting the power shaft connecter to the power shaft. The shaft coupler 210 may be removably clamped to the replacement power head 212, by a clamping mechanism, such as the head clamp mechanism 162 of FIG. 4A. Alternately, the shaft coupler 210 may be permanently attached to the replacement power head 212.

In versions of this example in which the replacement power head 212 has an electric motor, an add-on switch 266 with a switch cable 268 may be installed on the tool head 204, to control the electric motor. The switch cable 268 is connected to the switch cable socket 160 of the replacement power head 212. The add-on switch 266 may be manifested as a trigger switch, a press-button switch or a toggle lever switch, by way of example. In versions of this example in which the replacement power head 212 has an electric motor and the tool head 204 has an original switch with an original switch cable, not shown, the original switch may be retained on the tool head 204 and the original switch cable may be connected to the replacement power head 212. Alternatively, the original switch may be retained on the tool head 204 and a replacement switch cable may be provided and connected to the original switch and the replacement power head 212.

Figure 5D:
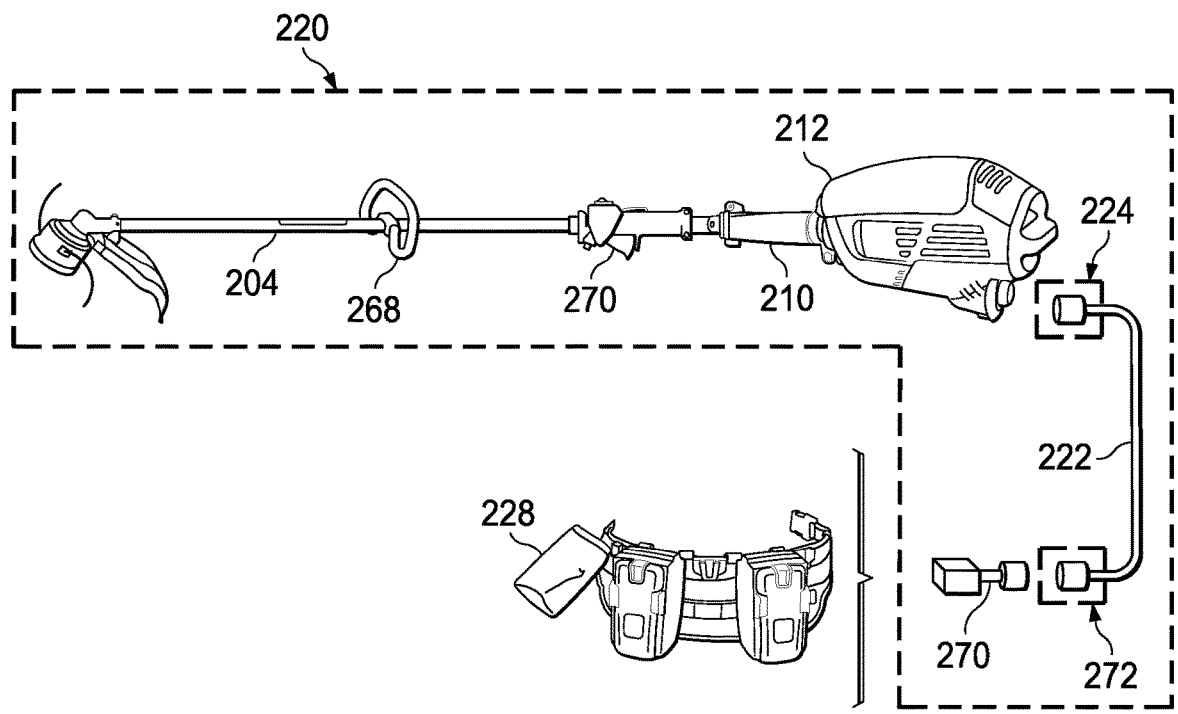

Referring to FIG. 5D, the replacement power head 212, coupled to the tool head 204 through the shaft coupler 210, provides a refurbished handheld landscape power tool 220, referred to herein as the refurbished power tool 220. The refurbished power tool 220 of this example includes the add-on switch 266 and the switch cable 268 of FIG. 5C.

The refurbished power tool 220 may optionally include a power cable 222 and a power cable adapter 270, to electrically couple the replacement power head 212 to an external power source 228, such as a battery belt 228, as depicted in FIG. 5D. Other manifestations of the external power source 228, such as a battery backpack, are within the scope of this example. The power cable 222 includes a power head plug 224 that is configured to be capable of connecting to the power cable socket of the replacement power head 212. The power cable 222 of this example includes a power source connector 272. The power cable adapter 270 has a cable-side connector configured to electrically couple to the power source connector 272 and a power source-specific plug configured to electrically couple to the external power source 228. The external power source 228 may be electrically coupled to the replacement power head 212 through the power cable adapter 270 and the power cable 222. Having the power cable 222 with the power cable adapter 270 may advantageously enable use of a desired manifestation of the external power source 228 with the refurbished power tool 220, resulting in a lower total cost for the user.

Figure 6:
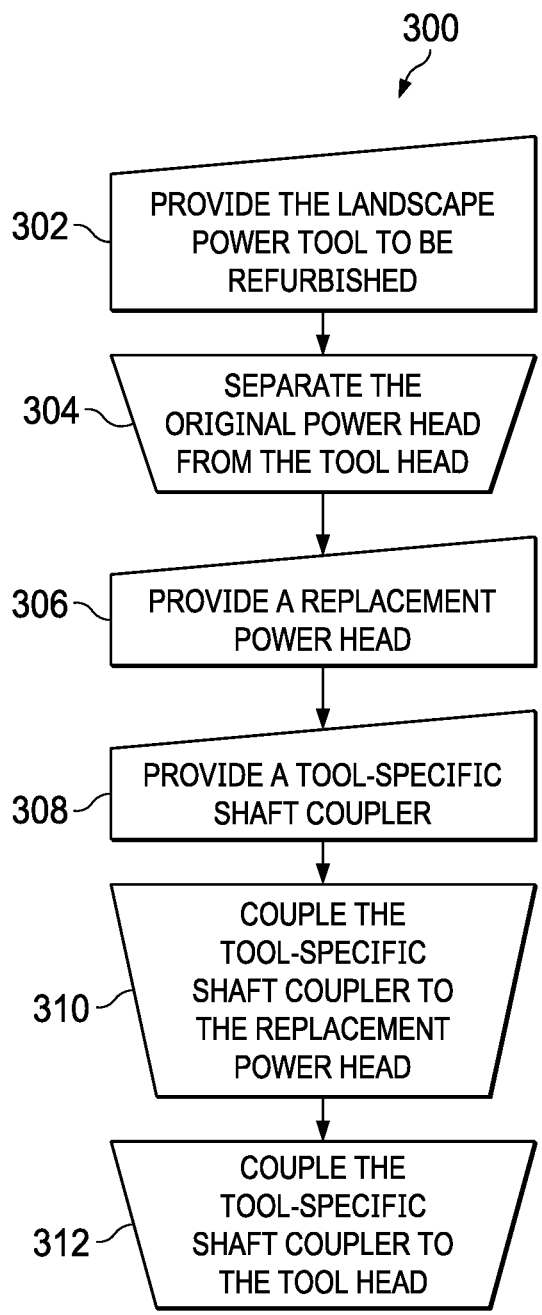
FIG. 6 is a flowchart of an example method of refurbishing a handheld landscape power tool.

FIG. 6 is a flowchart of an example method 300 of refurbishing a handheld landscape power tool. Step 302 is to provide the handheld landscape power tool to be refurbished, referred to herein as the original power tool. The original power tool includes a tool head coupled to an original power head. The original power head includes a motor, such as an electric motor or a combustion engine. The tool head may include a string trimmer head, a blade trimmer head, a reciprocating saw head, a chain saw head, and a hedge trimmer head, a garden tiller head, a pruning shears head, or a lawn edger head, by way of example. The tool head includes a tool shaft. The original power tool may include an original throttle with an original throttle cable, which may optionally be retained.

Step 304 is to separate the original power head from the tool head. Separating the original power head from the tool head may include unclamping the original power head from the tool head, or removing fasteners such as screws, bolts, or rivets. The tool shaft of the tool head is exposed after the original power head is separated from the tool head.

Step 306 is to provide a replacement power head. The replacement power head includes an electric motor that is mechanically coupled to a power shaft. The replacement power head also includes an electric switch that is electrically coupled to the electric motor, to control electric power to the electric motor. The replacement power head further includes a throttle cable adapter that is mechanically coupled to the electric switch, configured to operate the electric switch. The replacement power head also includes a power cable socket that is electrically coupled to the electric switch. The replacement power head is free of a combustion engine, and is free of a battery electrically coupled to the electric motor. The replacement power head may be similar to the replacement power head 112 of FIG. 4A.

Step 308 is to provide a shaft coupler. The shaft coupler includes a shaft-specific connecter that is configured to be capable of being mechanically connected to the tool shaft of the tool head. The shaft coupler also includes a power shaft connecter that is configured to be capable of being mechanically connected to the power shaft of the replacement power head. The power shaft connecter is coupled to the shaft-specific connecter, to enable efficient transfer of rotational mechanical power from the power shaft to the tool shaft.

Step 310 is to couple the shaft coupler to the replacement power head. Coupling the shaft coupler to the replacement power head includes mechanically connecting the power shaft connecter of the shaft coupler to the power shaft of the replacement power head. The shaft coupler may be removably clamped to the replacement power head, or may be permanently attached to the replacement power head.

Step 312 is to couple the shaft coupler to the tool head. Coupling the shaft coupler to the tool head includes mechanically connecting the shaft-specific connecter of the shaft coupler to the tool shaft of the tool head. The shaft coupler may be removably clamped to the tool head, or may be permanently attached to the tool head.

Figure 7:
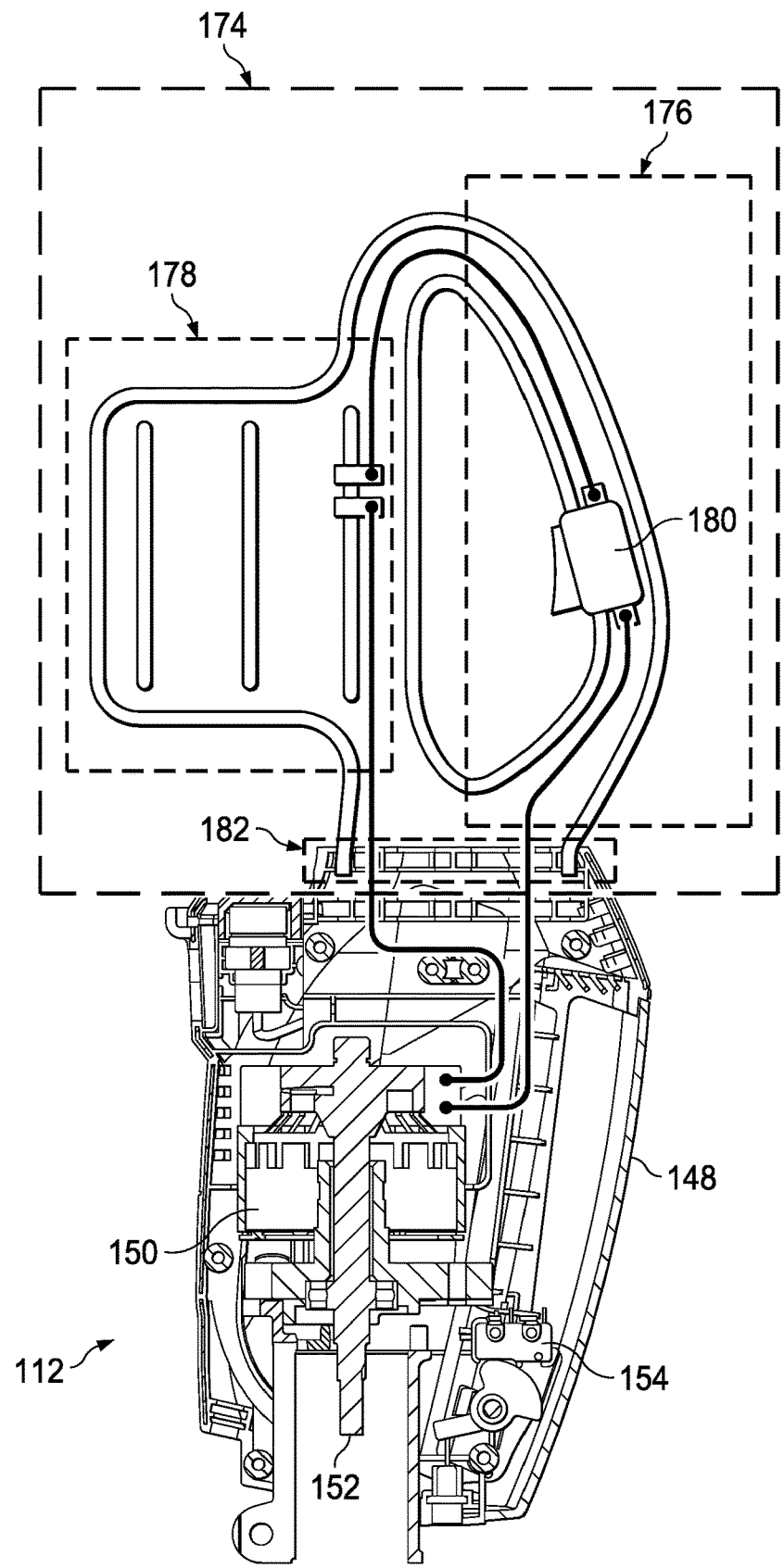
FIG. 7 depicts an example configuration of the replacement power head with an optional first rear extension.

FIG. 7 depicts an example configuration of the replacement power head 112 with an optional first rear extension 174 attached opposite from the power shaft 152. In this example, the first rear extension 174 may include a rear handle 176, which may advantageously provide improved maneuverability for the handheld electrically powered landscaping tool. The first rear extension 174 may include a first battery mount 178, configured to accept one or more commercially available batteries. Having the first battery mount 178 on the first rear extension 174 may provide a more convenient alternative to an external battery pack such as a battery backpack, for smaller landscaping jobs. The first rear extension 174 may include a rear electric switch 180, which may be mounted on the rear handle 176, as depicted in FIG. 7. In one version of this example, the rear electric switch 180 may be electrically coupled between the first battery mount 178 and the electric motor 150 of the replacement power head 112, as depicted in FIG. 7. The rear electric switch 180 may thus control electrical power from a battery, not shown, mounted in the first battery mount 178 to the electric motor 150. In another version of this example, in which the first battery mount 178 is omitted, the rear electric switch 180 may be wired in parallel to the electric switch 154 in the replacement power head 112.

The first rear extension 174 may be attached to the replacement power head 112 at an accessory port 182 of the replacement power head 112, located opposite from the power shaft 152. The first rear extension 174 may be permanently attached, for example with adhesive, screws, or rivets. Alternatively, the first rear extension 174 may be removably attached, for example with detents or a threaded collar.

Figure 8:
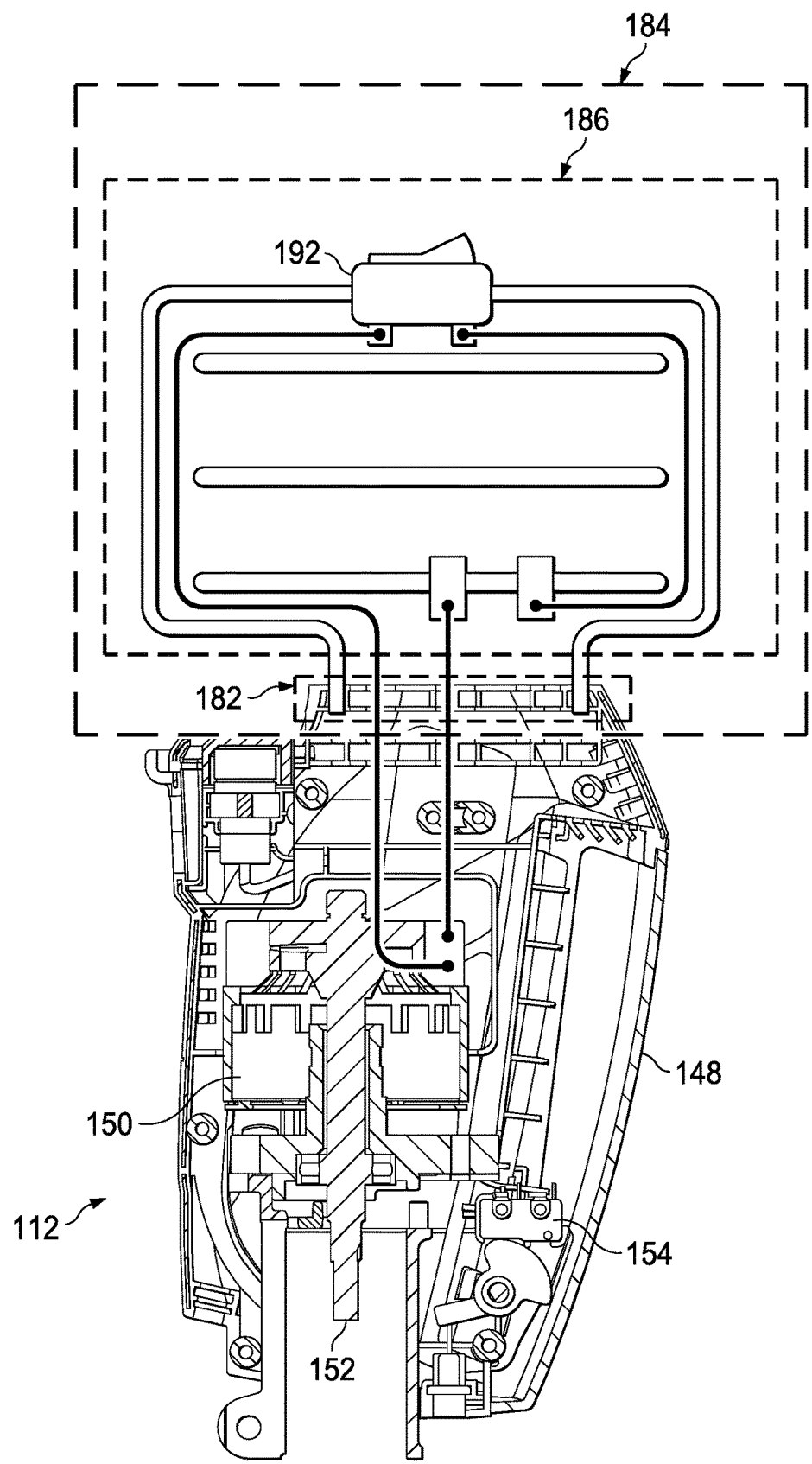
FIG. 8 depicts an example configuration of the replacement power head with an optional second rear extension.

FIG. 8 depicts another example configuration of the replacement power head 112 with an optional second rear extension 184 attached at the accessory port 182. In this example, the second rear extension 184 may include a second battery mount 186 configured to accept one or more commercially available batteries. The second rear extension 184 may include a second rear electric switch 192, which may be mounted on the second battery mount 186, as depicted in FIG. 8. The second rear electric switch 192 may be electrically coupled between the second battery mount 186 and the electric motor 150 of the replacement power head 112, as depicted in FIG. 8. The second rear electric switch 192 may thus control electrical power from a battery, not shown, mounted in the second battery mount 186 to the electric motor 150. The second rear extension 184 may be free of a handle, which may advantageously reduce a length of the handheld electrically powered landscaping tool and thus improve balance of the handheld electrically powered landscaping tool when implemented with long tool heads. The second rear extension 184 may be attached to the replacement power head 112 permanently, or removably.

Various features of the examples disclosed herein may be combined in other implementations of example methods of refurbishing handheld landscape power tools. In one example, a method of refurbishing a handheld landscape power tool may include retaining an original throttle and retaining an original throttle cable, and connecting the original throttle cable to the throttle cable adapter in the replacement power head. In another example, a method of refurbishing a handheld landscape power tool may include retaining an original throttle and providing a replacement throttle cable, and connecting the replacement throttle cable to the throttle cable adapter in the replacement power head. In a further example, a method of refurbishing a handheld landscape power tool may include providing a replacement throttle and providing a replacement throttle cable, and connecting the replacement throttle cable to the throttle cable adapter in the replacement power head.

In one example, a method of refurbishing a handheld landscape power tool may include retaining an original switch on the tool head and retaining an original switch cable, and connecting the original switch cable to the replacement power head. In another example, a method of refurbishing a handheld landscape power tool may include retaining an original switch on the tool head and providing a replacement switch cable, and connecting the replacement switch cable to the replacement power head. In a further example, a method of refurbishing a handheld landscape power tool may include providing a replacement switch and providing a replacement switch cable, and connecting the replacement switch cable to the replacement power head.

In one example, a method of refurbishing a handheld landscape power tool may include providing a power cable with a power cable adapter having a power source-specific plug for an external power source. In another example, a method of refurbishing a handheld landscape power tool may include providing a power cable and providing a power cable adapter for an external power source. In a further example, a method of refurbishing a handheld landscape power tool may provide a refurbished power tool without a power cable.

In one example, a method of refurbishing a handheld landscape power tool may include providing a rear extension having a rear handle with a rear electric switch, attaching the rear extension to the replacement power head, and connecting the rear switch to the replacement power head. In another example, a method of refurbishing a handheld landscape power tool may include providing a rear extension having a rear handle with a rear electric switch and a battery mount, attaching the rear extension to the replacement power head, and connecting the rear switch to the replacement power head. In a further example, a method of refurbishing a handheld landscape power tool may include providing a rear extension having a battery mount with a rear electric switch, attaching the rear extension to the replacement power head, and connecting the rear switch to the replacement power head.

While various embodiments of the present disclosure have been described above, it should be understood that they have been presented by way of example only and not limitation. Numerous changes to the disclosed embodiments can be made in accordance with the disclosure herein without departing from the spirit or scope of the disclosure. Thus, the breadth and scope of the present invention should not be limited by any of the above described embodiments. Rather, the scope of the disclosure should be defined in accordance with the following claims and their equivalents.

What is claimed is:

1. A method of refurbishing a handheld landscape power tool, comprising:
   providing the handheld landscape power tool, the handheld landscape power tool including:
   a tool head, the tool head including a tool shaft; and
   an original power head having a complementary configuration to the tool shaft, the original power head including an original motor;
   separating the original power head from the tool head;
   providing a replacement power head, the replacement power head including:
   a motor; and
   a power shaft mechanically coupled to the motor of the replacement power head, wherein the power shaft lacks a complementary configuration to the tool shaft;
   providing a shaft coupler, separate from the tool head and the replacement power head, the shaft coupler including:
   a power shaft connecter configured to be capable of being mechanically connected to the power shaft;
   a shaft-specific connecter having a complementary configuration to the tool shaft, configured to be capable of being mechanically connected to the tool shaft, the shaft-specific connecter being mechanically coupled to the power shaft connecter; and
   a coupler housing, wherein the power shaft connecter and the shaft-specific connecter are rotationally supported in the coupler housing;
   coupling the shaft coupler to the tool head, including connecting the shaft-specific connecter to the tool shaft; and
   coupling the shaft coupler to the replacement power head, including connecting the power shaft connecter to the power shaft.

2. The method of claim 1, wherein the motor of the replacement power head is a direct current (DC) electric motor.

3. The method of claim 2, wherein the replacement power head includes an electric switch coupled to the DC electric motor, configured to control electric power to the DC electric motor.

4. The method of claim 3, wherein the replacement power head includes a throttle cable adapter mechanically coupled to the electric switch, configured to operate the electric switch.

5. The method of claim 4, wherein the tool head includes an original throttle having an original throttle cable, and further comprising connecting the original throttle cable to the throttle cable adapter.

6. The method of claim 4, wherein the tool head includes an original throttle, and further comprising:
   removing the original throttle;
   providing a replacement throttle having a replacement throttle cable configured to be capable of being mechanically connected to the throttle cable adapter;
   installing the replacement throttle on the tool head; and
   connecting the replacement throttle cable to the throttle cable adapter.

7. The method of claim 2, wherein the replacement power head includes a switch cable socket electrically coupled to the motor of the replacement power head, and further comprising:
   providing an add-on switch with a switch cable;
   attaching the add-on switch to the tool head; and
   connecting the switch cable to the switch cable socket.

8. The method of claim 2, wherein the replacement power head includes a power cable socket electrically coupled to the motor of the replacement power head, and further comprising providing a power cable having a power head plug configured to make an electrical connection to the power cable socket.

9. The method of claim 8, wherein the power cable has a power source-specific plug configured to be capable of being electrically connected to an external power source.

10. The method of claim 8, wherein:
    the power cable has a power source connector; and further comprising providing a power cable adapter having a cable-side connector configured to be capable of being electrically connected to the power source connector and a power source-specific plug configured to be capable of being electrically connected to an external power source.

11. The method of claim 1, wherein the replacement power head includes a head clamp mechanism around the power shaft configured to be capable of being clamped on the shaft coupler, and further comprising clamping the replacement power head to the shaft coupler using the head clamp mechanism.

12. The method of claim 1, wherein the shaft coupler includes a coupler clamp mechanism around the shaft-specific connecter configured to be capable of being clamped on the tool head, and further comprising clamping the shaft coupler to the tool head using the coupler clamp mechanism.

13. The method of claim 1, further comprising attaching a rear extension to the replacement power head, the rear extension including a battery mount and a rear electric switch coupled to the battery mount.

14. The method of claim 1, further comprising attaching a rear extension to the replacement power head, the rear extension including a rear handle, a battery mount, and a rear electric switch coupled to the battery mount.

15. The method of claim 1, wherein the power shaft has a cross section selected from the group consisting of a square cross section, a splined cross section, and a splined socket configuration.

16. The method of claim 1, wherein the tool shaft has a cross section selected from the group consisting of a six-spline configuration, a nine-spline configuration, and a seven-spline configuration.

17. The method of claim 1, wherein the tool head is selected from the group consisting of a string trimmer head, blade trimmer head, a reciprocating saw head, a chain saw head, a hedge trimmer head, a garden tiller head, a pruning shears head, and a lawn edger head.

18. The method of claim 1, wherein the shaft coupler is 3 inches to 7 inches long.

19. The method of claim 1, wherein the shaft coupler includes a shaft spring in the shaft-specific connecter, the shaft spring contacting the tool shaft when the shaft-specific connecter is connected to the tool shaft.

20. The method of claim 1, wherein the original motor is a combustion engine.

\* \* \* \* \*